US008131928B2

(12) United States Patent
Pidapa

(10) Patent No.: US 8,131,928 B2
(45) Date of Patent: Mar. 6, 2012

(54) RESTORING STRIPED VOLUMES OF DATA

(75) Inventor: Manorama Pidapa, Andhra Pradesh (IN)

(73) Assignee: Computer Associates Think, Inc., Islandia, NY (US)

( * ) Notice: Subject to any disclaimer, the term of this patent is extended or adjusted under 35 U.S.C. 154(b) by 456 days.

(21) Appl. No.: 12/434,027

(22) Filed: May 1, 2009

(65) Prior Publication Data
US 2010/0281215 A1    Nov. 4, 2010

(51) Int. Cl.
*G06F 12/00*    (2006.01)
(52) U.S. Cl. ......................... 711/114; 711/162
(58) Field of Classification Search .................. 711/114, 711/162
See application file for complete search history.

(56) References Cited

U.S. PATENT DOCUMENTS

| 5,644,787 | A |   | 7/1997 | Nakamura et al. |
| 5,671,350 | A | * | 9/1997 | Wood ............................. 714/15 |
| 6,016,553 | A |   | 1/2000 | Schneider et al. ............... 714/21 |
| 6,446,175 | B1 |  | 9/2002 | West et al. ...................... 711/162 |
| 6,505,216 | B1 |  | 1/2003 | Schutzman et al. .......... 707/204 |
| 6,742,138 | B1 |  | 5/2004 | Gagne et al. |
| 7,337,289 | B2 | * | 2/2008 | Pillai et al. .................... 711/162 |
| 7,487,308 | B1 | * | 2/2009 | Dalal et al. .................... 711/162 |
| 7,516,288 | B2 | * | 4/2009 | Pillai et al. .................... 711/162 |

OTHER PUBLICATIONS

USPTO Office Action U.S. Appl. No. 12/434,052; to Manorama Pidapa; 24 pages dated Jun. 27, 2011.
Manorama Pidapa "Amendment Pursuant To 37 C.F.R. §1.111" filed Oct. 31, 2011, 11 pages.

* cited by examiner

*Primary Examiner* — Son Dinh
(74) *Attorney, Agent, or Firm* — Baker Botts L.L.P.

(57) ABSTRACT

According to one embodiment, a backup is searched for data to be restored from a striped volume. The backup comprises multiple disks divided into stripes. The stripes that contain data to be restored from the striped volume are identified as desired stripes, and a current disk is searched for the desired stripes. The content of a first subset of desired stripes is read from the current disk. A second subset of desired stripes that are not on the current disk are recorded on an unread list. The remaining content is read from the remaining disks according to the unread list.

18 Claims, 2 Drawing Sheets

RESTORING STRIPED VOLUMES OF DATA

TECHNICAL FIELD

The present disclosure relates generally to data restoration, and more specifically to restoring striped volumes of data of Virtual Machines.

BACKGROUND

A Virtual Machine may be a software application that is installed on a physical computer. The functionality provided by the Virtual Machine may be similar to that provided by the physical computer. For example, the Virtual Machine may run software programs. A backup process may copy the data of the Virtual Machine for use in the event that the original data becomes lost, damaged, or otherwise unusable. The backed up data may be used to restore the original data.

SUMMARY OF EXAMPLE EMBODIMENTS

According to one embodiment, a backup is searched for data to be restored from a striped volume. The backup comprises multiple disks divided into stripes. The stripes that contain data to be restored from the striped volume are identified as desired stripes, and a current disk is searched for the desired stripes. The content of a first subset of desired stripes is read from the current disk. A second subset of desired stripes that are not on the current disk are recorded on an unread list. The remaining content is read from the remaining disks according to the unread list.

Certain embodiments of the invention may provide one or more technical advantages. A technical advantage of one embodiment may be that data from a single volume of a Virtual Machine may be efficiently read from outside the Virtual Machine. That is, data from the volume of the Virtual Machine may be read without having to restore the entire Virtual Machine. As a result, the amount of time and/or local storage space required to restore the data from the volume may be decreased.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of certain embodiments of the present invention and features and advantages thereof, reference is now made to the following description taken in conjunction with the accompanying drawings, in which.

DETAILED DESCRIPTION

Figure 1:
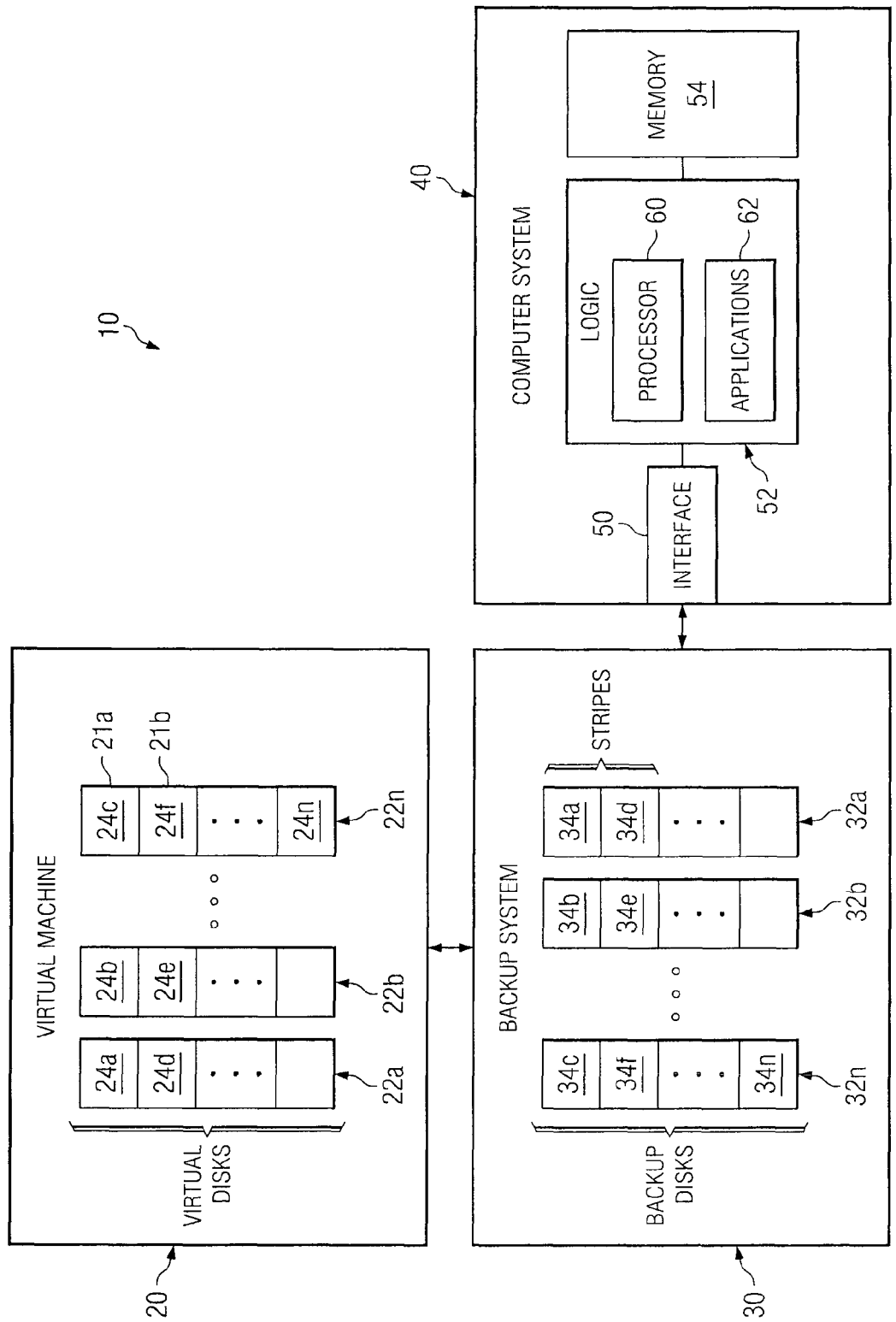
FIG. 1 illustrates an example of a system that may be used to restore data from a striped volume of a Virtual Machine.
Figure 2:
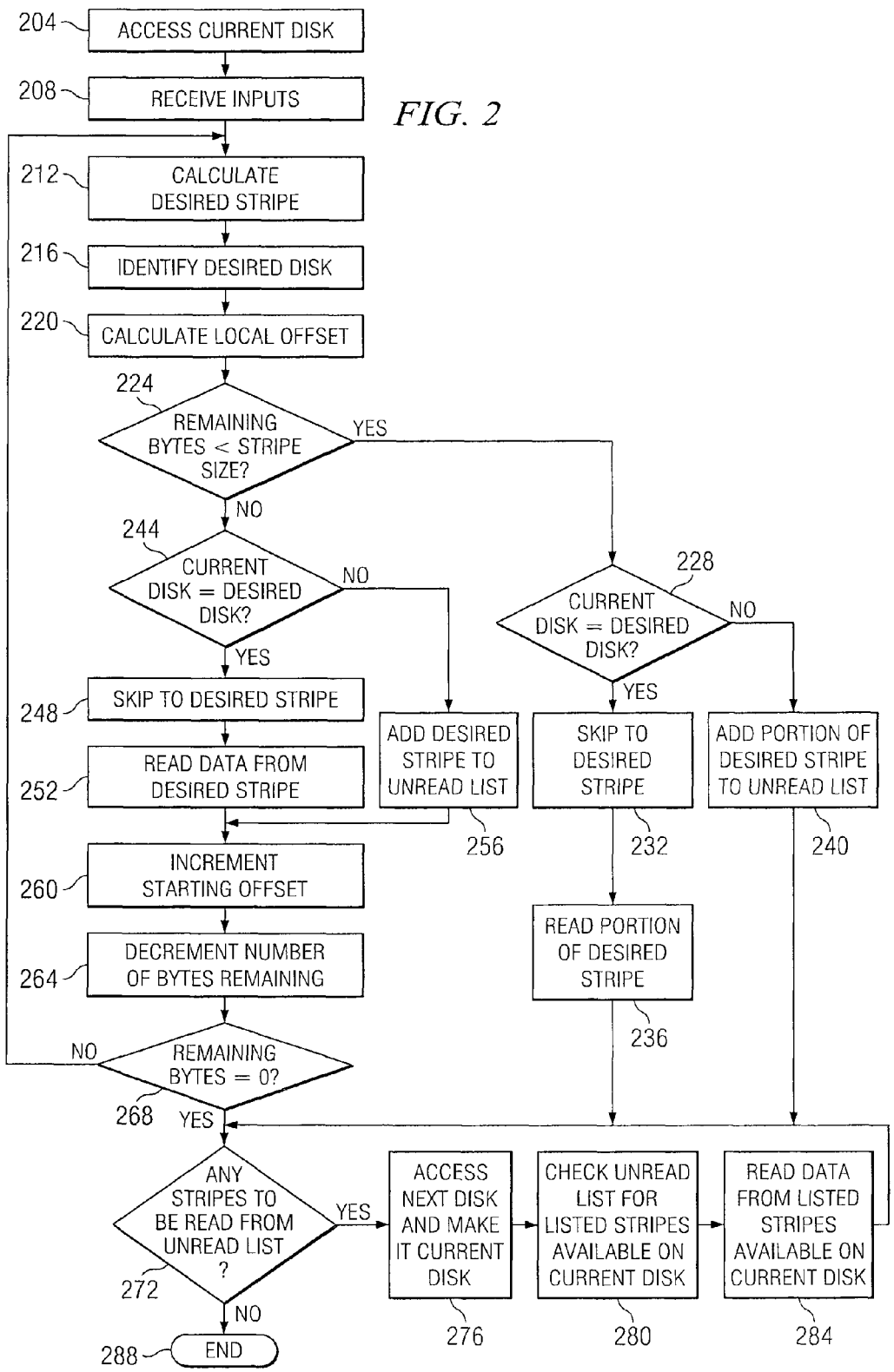
FIG. 2 illustrates an example method for restoring data from a striped volume of a Virtual Machine.

Embodiments of the present invention and its advantages are best understood by referring to FIGS. 1 and 2 of the drawings, like numerals being used for like and corresponding parts of the various drawings.

FIG. 1 illustrates an example of a system 10 that may be used to restore data from a striped volume of a Virtual Machine. In certain embodiments, system 10 may comprise a Virtual Machine 20, a backup system 30, and a computer system 40. The Virtual Machine 20 may be a software application comprising data, which may be copied to the backup system 30. The computer system 40 may access the backup system 30 to read and/or restore the data. For example, the computer system 40 may restore the data from the backup system 30 if the original data becomes inaccessible or unusable. In certain embodiments, the computer system 40 may restore particular volumes of data without reading all the data of backup system 30.

In some embodiments, the Virtual Machine 20 may be a software application installed on a computer. The Virtual Machine 20 may provide computer functionality without requiring the entire hardware resources of a physical computer. For example, the Virtual Machine 20 may run software programs. The Virtual Machine 20 may comprise any suitable number of virtual disks 22. The virtual disks 22 may be functionally similar to hard disks of a physical machine and may comprise volumes. The volumes may comprise data files of the Virtual Machine 20, such as document files, text files, or any other files. The virtual disks 22 may store the volumes in any suitable manner. In some embodiments, a complete volume may be stored on a single disk. Examples of volumes stored on a single disk include simple volumes and mirrored volumes. In some embodiments, a complete volume may be stored on multiple disks. Examples of volumes stored on multiple disks include striped volumes and spanned volumes.

To store a striped volume, a virtual disk 22 may be divided into stripes 24. The stripes 24 may have a uniform stripe size. As an example, each stripe may be configured to store 64 kilobytes of content. In other embodiments, each stripe may store 32 or 128 kilobytes of content. Multiple stripes 24 may be required to store a volume that is larger than the stripe size. In some embodiments, the volume may be stored horizontally across multiple virtual disks 22.

In some embodiments, a volume may be stored horizontally in rows 21 of Virtual Machine 20. In the illustrated example, the stripes may be stored in the order of stripe 24a, stripe 24b, stripe 24c, stripe 24d, and so on, where stripe 24a is stored on a first row 21a of a first virtual disk 22a, stripe 24b is stored on the first row 21a of a second virtual disk 22b, stripe 24c is stored on the first row 21a of a last virtual disk 22n, and stripe 24d is stored on a second row 21b of the first virtual disk 22a.

Each stripe 24 of the Virtual Machine 20 may have a stripe sequence comprising a disk identifier and a row identifier. The disk identifier may indicate the virtual disk 22 that the stripe 24 is on, and the row identifier may indicate a position (such as row 21) of the stripe 24 on its virtual disk 22. For example, a first row 21a of stripes 24 may comprise the first 64 kilobytes of each virtual disk 22, a second row 21b of stripes 24 may comprise the next 64 kilobytes of each virtual disk 22, and so on. The volume may be stored by rows 21 such that a first stripe with a first row identifier and a first disk identifier may be followed by a second stripe with the first row identifier and a second disk identifier. Upon reaching a last-of-row stripe having the first row identifier and a last disk identifier, a new row may begin on the first disk. In the example, a start-of-row stripe may have a second row identifier and the first disk identifier. Although FIG. 1 illustrates one example of a striped volume, the striped volume may be configured in any suitable way. For example, the striped volume may begin on any stripe 24 of the Virtual Machine 20. Moreover, the Virtual Machine 20 may have any suitable number of virtual disks 22 and number of stripes 24 per disk.

In some embodiments, the backup system 30 may backup the Virtual Machine 20. For example, the backup system 30 may copy each of the virtual disks 22 to backup disks 32. In the illustration of FIG. 1, the backup disk 32a may backup the virtual disk 22a, the backup disk 32b may backup the virtual disk 22b, and so on. The backup disks 32 may be divided into stripes 34. The stripes 34 of backup system 30 may be copies of the stripes 24 of the Virtual Machine 20. Accordingly, a stripe 34a on the backup disk 32a may be a copy of the stripe 24a on the virtual disk 22a. The stripe 34a may have the same stripe sequence, row identifier, and disk identifier as its counterpart stripe 24a. In some embodiments, the order of the backup disks 32 on the backup system 30 may differ from the order of the virtual disks 22 on the Virtual Machine 20. In some embodiments, the virtual disks 22 may be backed up in reverse order. For example, the virtual disk 22a located at the beginning of the Virtual Machine 20 may correspond to the backup disk 32a located at the end of the backup system 30. Although the storage order of the disks may change, the disk identifier indicating the logical sequence of the disks remains the same.

In some embodiments, a backup disk 32 may be a file. The file may be any suitable format, such as virtual hard disk (.vhd) format or Virtual Machine disk (.vmkd) format. The backup disks 32 may be stored to a Compact Disk (CD), a Digital Video Disk (DVD), a hard disk, a flash memory device, a tape, or any other tangible computer readable medium. In some embodiments, the computer readable medium may be sequential. A sequential computer readable medium may limit access to data to the order in which the data was stored. An example of a sequential computer readable medium may be a tape. In some embodiments, a tape may store the backup disks 32 in the reverse order of their logical sequence.

In some embodiments, the computer system 40 may access the backup system 30 to restore the Virtual Machine 20. In some embodiments, the computer system 40 may restore a particular file/folder from a volume of the Virtual Machine 20. The computer system 40 may parse the data of the backup system 30 to take data that arrives out of order and arrange it into the correct order. Data from volumes stored on multiple disks may arrive out of order and, therefore, may benefit from parsing. These volumes may include volumes striped across multiple disks and/or volumes stored to disks arranged in reverse order on sequential computer readable media. In some embodiments, computer system 40 may parse the data according to the method of FIG. 2, discussed below. The method of FIG. 2 may allow the computer system 40 to restore data from a striped volume without storing all of the backup disks 32 together in local storage. As a result, the restore time and/or the amount of local space required to perform the restore may be decreased.

In certain embodiments, computer system 40 may comprise an interface 50, logic 52, memory 54, and/or other suitable element. Interface 50 receives input, sends output, processes the input and/or output, and/or performs other suitable operation. In certain embodiments, interface 50 accesses a backup disk 32 of the backup system 30. Interface 50 may comprise hardware and/or software.

Logic 52 performs the operations of the component, for example, executes instructions to generate output from input. In certain embodiments, logic 52 may restore data from a striped volume of the Virtual Machine 20. Logic 52 may restore the striped volume by parsing the data of the backup disks 32.

Logic 52 may include hardware (such as a processor 60), software (such as applications 64), and/or other logic. Logic 52 may be encoded in one or more tangible media and may perform operations when executed by a computer. Certain logic 52, such as a processor 60, may manage the operation of a component. Examples of a processor 60 include one or more computers, one or more microprocessors, one or more applications, and/or other logic.

In particular embodiments, the operations of the embodiments may be performed by one or more computer readable media encoded with a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

Memory 54 stores information. Memory 54 may comprise one or more tangible, computer-readable, and/or computer-executable computer readable medium, and may exclude signals or carrier waves. Examples of memory include computer memory (for example, Random Access Memory (RAM) or Read Only Memory (ROM)), mass computer readable media (for example, a hard disk), removable computer readable media (for example, a Compact Disk (CD) or a Digital Video Disk (DVD)), database and/or network storage (for example, a server), and/or other computer-readable medium.

Modifications, additions, or omissions may be made to system 10 without departing from the scope of the invention. The components of system 10 may be integrated or separated. Moreover, the operations of system 10 may be performed by more, fewer, or other components. For example, the operations of restoring data from a striped volume may be performed by one component or more than one component. Additionally, operations of system 10 may be performed using any suitable logic comprising software, hardware, and/or other logic. As used in this document, "each" refers to each member of a set or each member of a subset of a set.

FIG. 2 illustrates an example method 200 for restoring data from a striped volumes of a Virtual Machine. According to the method 200, a computer system may access a current disk of a backup system. The computer system may parse through the current disk to locate the stripes of a volume (the desired stripes). The subset of desired stripes available on the current disk may be read by the computer system, and the subset of desired stripes that are not available on the current disk may be recorded in an unread list. A subset may include zero, one, or more stripes. The unread list may track the position, the size, and/or the disk of each unread stripe. After the current disk has been checked for the desired stripes, the computer system may access the next disks of the backup system to read the desired stripes listed on the unread list. The content read from each stripe may be inserted into its appropriate position within the restored data (the files/folders restored from the volume). Thus, the data from the volume may be restored vertically (i.e., by disk) rather than horizontally (i.e., by row).

The method 200 may begin at step 204. At step 204, the current disk may be accessed and tracking mechanisms for the backup system may be initialized. The current disk may be any disk of the backup. For example, if the disks are backed up to a tape, the current disk may be the disk stored at the beginning of the tape. The current disk may be stored locally while it is being processed. In some embodiments, the remaining disks of the backup need not be stored locally while the current disk is being processed. Tracking mechanisms may include an unread list, a starting offset, a number of bytes remaining, and/or a stripe size.

At step 208, inputs are received. The inputs may comprise a starting offset, a number of bytes remaining, and/or a stripe size. The initial starting offset may indicate the place within the backup that the data to be restored from the volume begins. The initial number of bytes remaining may indicate the total size of the data to be restored from the volume. The stripe size may be a uniform size indicating the maximum amount of content that may be stored per stripe.

A desired stripe is calculated at step 212. In some embodiments, the desired stripe may be calculated by dividing the starting offset by the stripe size. The calculation may indicate the number of stripes of the backup to be skipped to locate the desired stripe. At step 216, the desired disk may be identified. The desired disk may be the disk that comprises the desired stripe. In some embodiments, the desired disk may be identified by dividing the stripe sequence number of the desired stripe by the number of disks in the backup system.

A local offset may be calculated at step 220. The local offset may indicate the row of the desired stripe. In some embodiments, the local offset may be used to determine the number of stripes of the desired disk to be skipped to locate the desired stripe.

At step 224, it may be determined whether the remaining bytes fall within a single stripe. For example, the number of bytes remaining may be compared to the stripe size. If the number of bytes remaining is less than the stripe size, the method continues to step 228.

At step 228, the computer system may determine if a stripe is on the current disk. The current disk accessed in step 204 may be compared to the desired disk identified in step 216. If the disks are the same, the stripe is on the current disk and the method continues to step 232.

At step 232, the computer system locates the desired stripe on the current disk. For example, the computer system may use the local offset from step 220 to skip to the desired stripe. Upon locating the desired stripe, the method proceeds to step 236. At step 236, a desired portion of the desired stripe is read. The desired portion may be the portion of the stripe belonging to the data to be restored from the volume, and it may be determined based on the number of bytes remaining. The method then proceeds to step 272.

If the desired stripe is not on the current disk at step 228, the method proceeds to step 240. At step 240, a desired portion of the desired stripe is added to the unread list. The desired portion may be the portion of the stripe belonging to the data to be restored from the volume, and it may be determined based on the number of bytes remaining. In some embodiments, the unread list may record a disk, starting offset, local offset, and/or number of bytes of the desired stripe. The unread list may be one list or multiple lists. For example, the unread list may be multiple lists each describing a particular disk of the backup. The method then proceeds to step 272.

If the remaining bytes do not fall within a single stripe at step 224, the method proceeds to step 244. At step 244, the computer system may determine if a stripe is on the current disk. The current disk accessed in step 204 may be compared to the desired disk identified in step 216. If the disks are the same, the desired stripe is on the current disk and the method continues to step 248.

At step 248, the computer system locates the desired stripe on the current disk. For example, step 248 may use the local offset from step 220 to skip to the desired stripe. Upon locating the desired stripe, the method proceeds to step 252 where the contents of the desired stripe are read. The method then proceeds to step 260.

If the desired stripe is not on the current disk at step 244, the method proceeds to step 256 where the desired stripe is added to the unread list. In some embodiments, the unread list may record a disk, starting offset, local offset, and/or number of bytes of the desired stripe. The unread list may be one list or multiple lists. For example, the unread list may be multiple lists each describing a particular disk of the backup. The method then proceeds to step 260.

At step 260, the starting offset may be incremented. If the desired stripe was read at step 252, the starting offset may be incremented by the number of bytes read. Alternatively, if the desired stripe was recorded to the unread list at step 256, the starting offset may be incremented by the number of bytes recorded to the list. In some embodiments, the size of the increment may be equal to the stripe size received in step 208. The method proceeds to step 264.

At step 264, the number of bytes remaining may be decremented. If the desired stripe was read at step 252, the number of bytes remaining may be decremented by the number of bytes read. Alternatively, if the desired stripe was recorded to the unread list at step 256, the number of bytes remaining may be decremented by the number of bytes recorded to the list. In some embodiments, the size of the decrement may be equal to the stripe size received in step 208. In some embodiments, the size of the decrement to the number of bytes remaining may be equal to the size of the increment to the starting offset in step 260. The method proceeds to step 268.

At step 268, the computer system determines whether the number of bytes remaining is equal to zero. If the number of bytes remaining is equal to zero, it may indicate that the current disk has been searched for all of the desired stripes. During the search, the available stripes may have been read from the current disk, while the remaining stripes may have been recorded to the unread list. If the number of bytes remaining does not equal zero, the method returns to step 212. If the number of bytes remaining is equal to zero, the method continues to step 272.

If the number of bytes remaining does not equal zero at step 268, it may indicate that the current disk has not been searched for all of the desired stripes. If the number of bytes remaining does not equal zero, the method returns to step 212. At step 212, a search is conducted for the next desired stripe based on the starting offset value calculated in step 260 and the number of bytes remaining value calculated in step 264.

At step 272, the computer system determines if there are any stripes to be read according to the unread list. If there are stripes to be read, the method proceeds to step 276.

In some embodiments, the computer system may access a next disk of the backup and make it the current disk at step 276. The method proceeds to step 280 where the computer system checks the unread list for listed stripes available on the current disk. For example, in embodiments where the unread list comprises multiple lists, the computer system may check the list corresponding to the now current disk. At step 284, the computer system may read the listed stripes available on the current disk. In some embodiments, the content of the stripe may be read into its correct position within the data restored from the volume according to the stripe's starting offset. The method then returns to step 272.

If there are not any stripes to be read according to the unread list, the method proceeds to step 288. At step 288, the method ends.

Modifications, additions, or omissions may be made to the method without departing from the scope of the invention. The method may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed:

1. A method comprising:
accessing a current disk of a backup, the backup comprising a plurality of disks, each disk divided into two or more stripes to yield a plurality of stripes for the plurality of disks, the plurality of stripes configured in a stripe sequence;
identifying a plurality of desired stripes of the plurality of stripes, the desired stripes storing content comprising data to be restored from a striped volume;
determining if one or more desired stripes of the plurality of desired stripes are on the current disk;
reading the content of a first subset of the one or more desired stripes, the first subset comprising the desired stripes on the current disk;
recording a second subset of the one or more desired stripes on an unread list, the second subset comprising the desired stripes that are not on the current disk; and
reading remaining content from one or more remaining disks according to the unread list.

2. The method of claim 1, further comprising:
each stripe of the plurality of stripes having:
    a disk identifier indicating the disk on which the stripe is located; and
    a row identifier indicating a position of the stripe on the disk;
the stripe sequence having:
    a first stripe with a first row identifier and a first disk identifier is followed by a second stripe with the first row identifier and a second disk identifier; and
    a last-of-row stripe with the first row identifier and a last disk identifier is followed by a start-of-row stripe with a second row identifier and the first disk identifier.

3. The method of claim 1, the reading the remaining content from the one or more remaining disks according to the unread list further comprising repeating until the remaining content indicated by the unread list has been read:
accessing a next disk of the backup;
determining if one or more desired stripes of the unread list are on the next disk; and
reading the content of the one or more desired stripes if they are on the next disk.

4. The method of claim 1, the identifying one or more desired stripes further comprising:
receiving an input comprising a starting offset for the desired stripe; and
calculating one or more stripes to be skipped based on the starting offset, the stripes to be skipped indicating the location of the desired stripe.

5. The method of claim 1:
the reading the content of the first subset of the one or more desired stripes further comprising:
    incrementing a starting offset by a number of bytes read, the starting offset indicating a location of the one or more desired stripes; and
the recording the second subset of the one or more desired stripes on the unread list further comprising:
    incrementing the starting offset by a number of bytes recorded.

6. The method of claim 1, reading the remaining content from the remaining disks according to the unread list further comprising:
continuing to read the remaining content until a number of bytes remaining is zero.

7. The method of claim 1:
the reading the content of the first subset of the one or more desired stripes further comprising:
    decrementing a number of bytes remaining by a number of bytes read, the number of bytes remaining indicating a portion of the data to be restored from the striped volume that has not been read or recorded on the unread list;
the recording the second subset of the one or more desired stripes on the unread list further comprising:
    decrementing the number of bytes remaining by a number of bytes recorded.

8. The method of claim 1, further comprising:
the reading the content of the first subset of the one or more desired stripes further comprising:
    incrementing a starting offset by a number of bytes read, the starting offset indicating a location of the one or more desired stripes; and
    decrementing a number of bytes remaining by the number of bytes read, the number of bytes remaining indicating a portion of the data to be restored from the striped volume that has not been read or recorded on the unread list; and
the recording the second subset of the one or more desired stripes on the unread list further comprising:
    incrementing the starting offset by a number of bytes recorded; and
    decrementing the number of bytes remaining by the number of bytes recorded.

9. The method of claim 1, the identifying one or more desired stripes further comprising:
receiving an a starting offset for the one or more desired stripes;
determining a desired disk based on the starting offset, the desired disk comprising the one or more desired stripes and a plurality of local stripes; and
calculating a local offset, the local offset indicating one or more local stripes to be skipped to locate the desired stripe.

10. An apparatus comprising:
an interface configured to:
    access a current disk of a backup, the backup comprising a plurality of disks, each disk divided into two or more stripes to yield a plurality of stripes for the plurality of disks, the plurality of stripes configured in a stripe sequence; and
one or more processors configured to perform the following logic:
    identify a plurality of desired stripes of the plurality of stripes, the desired stripes storing content comprising data to be restored from a striped volume;
    determine if one or more desired stripes of the plurality of desired stripes are on the current disk;
    read the content of a first subset of the one or more desired stripes, the first subset comprising the desired stripes on the current disk;
    record a second subset of the one or more desired stripes on an unread list, the second subset comprising the desired stripes that are not on the current disk; and
    read remaining content from one or more remaining disks according to the unread list.

11. The apparatus of claim 10, further comprising:
each stripe of the plurality of stripes having:
    a disk identifier indicating the disk on which the stripe is located; and
    a row identifier indicating a position of the stripe on the disk;

the stripe sequence having:
  a first stripe with a first row identifier and a first disk identifier is followed by a second stripe with the first row identifier and a second disk identifier; and
  a last-of-row stripe with the first row identifier and a last disk identifier is followed by a start-of-row stripe with a second row identifier and the first disk identifier.

12. The apparatus of claim 10:
the interface further configured to:
  access a next disk of the backup; and
the one or more processors configured to read the remaining content from the one or more remaining disks according to the unread list further comprising repeating until the remaining content indicated by the unread list has been read by:
  determining if one or more desired stripes of the unread list are on the next disk; and
  reading the content of the one or more desired stripes if they are on the next disk.

13. The apparatus of claim 10, the one or more processors configured to identify one or more desired stripes further comprising:
  receiving an input comprising a starting offset for the desired stripe; and
  calculating one or more stripes to be skipped based on the starting offset, the stripes to be skipped indicating the location of the desired stripe.

14. The apparatus of claim 10:
the one or more processors configured to read the content of the first subset of the one or more desired stripes further comprising:
  incrementing a starting offset by a number of bytes read, the starting offset indicating a location of the one or more desired stripes; and
the one or more processors configured to record the second subset of the one or more desired stripes on an unread list further comprising:
  incrementing the starting offset by a number of bytes recorded.

15. The apparatus of claim 10, the one or more processors configured to read the remaining content from the one or more remaining disks according to the unread list further comprising:
  continuing to read the remaining content until a number of bytes remaining is zero.

16. The apparatus of claim 10:
the one or more processors configured to read the content of the first subset of the one or more desired stripes further comprising:
  decrementing a number of bytes remaining by a number of bytes read, the number of bytes remaining indicating a portion of the data to be restored from the striped volume that has not been read or recorded on the unread list;
the one or more processors configured to record a second subset of the one or more desired stripes on an unread list further comprising:
  decrementing the number of bytes remaining by a number of bytes recorded.

17. The apparatus of claim 10:
the one or more processors configured to read the content of the first subset of the one or more desired stripes further comprising:
  incrementing a starting offset by a number of bytes read, the starting offset indicating a location of the one or more desired stripes; and
  decrementing a number of bytes remaining by the number of bytes read, the number of bytes remaining indicating a portion of the data to be restored from the striped volume that has not been read or recorded on the unread list; and
the one or more processors configured to record the second subset of the one or more desired stripes on an unread list further comprising:
  incrementing the starting offset by a number of bytes recorded; and
  decrementing the number of bytes remaining by the number of bytes recorded.

18. The apparatus of claim 10, the one or more processors configured to identify one or more desired stripes further comprising:
  receiving an a starting offset for the one or more desired stripes;
  determining a desired disk based on the starting offset, the desired disk comprising the one or more desired stripes and a plurality of local stripes; and
  calculating a local offset, the local offset indicating one or more local stripes to be skipped to locate the desired stripe.

* * * * *